(12) United States Patent
Clark (10) Patent No.: US 7,590,490 B2
(45) Date of Patent: Sep. 15, 2009

(54) SMART DETOUR

(75) Inventor: Brant Clark, San Dimas, CA (US)

(73) Assignee: MiTAC International Corporation, Taoyuan (TW)

( * ) Notice: Subject to any disclaimer, the term of this patent is extended or adjusted under 35 U.S.C. 154(b) by 406 days.

(21) Appl. No.: 11/327,450

(22) Filed: Jan. 9, 2006

(65) Prior Publication Data

US 2007/0162223 A1 Jul. 12, 2007

(51) Int. Cl.
G01C 21/30 (2006.01)

(52) U.S. Cl. .......................... 701/210; 701/23; 701/25; 701/26; 701/201; 701/202; 701/209; 340/994; 340/995.19; 340/995.21

(58) Field of Classification Search ................ 701/201, 701/210, 23, 25, 26, 202, 211, 209; 340/994, 340/995.19, 995.21
See application file for complete search history.

(56) References Cited

U.S. PATENT DOCUMENTS

| 5,220,507 | A | * | 6/1993 | Kirson | ........................ | 701/202 |
|---|---|---|---|---|---|---|
| 5,274,560 | A | * | 12/1993 | LaRue | ........................ | 701/202 |
| 5,515,283 | A | * | 5/1996 | Desai et al. | .................. | 701/200 |
| 5,848,364 | A | * | 12/1998 | Ohashi | ......................... | 701/26 |
| 5,928,307 | A | * | 7/1999 | Oshizawa et al. | ........... | 701/210 |
| 6,084,989 | A | | 7/2000 | Eppler | | |
| 6,092,076 | A | | 7/2000 | McDonough et al. | | |
| 6,107,944 | A | | 8/2000 | Behr et al. | | |
| 6,108,603 | A | | 8/2000 | Karunanidhi | | |
| 6,108,604 | A | | 8/2000 | Fakaga et al. | | |
| 6,115,669 | A | | 9/2000 | Watanabe et al. | | |
| 6,124,826 | A | | 9/2000 | Garthwaite et al. | | |
| 6,125,326 | A | | 9/2000 | Ohmura et al. | | |
| 6,141,621 | A | | 10/2000 | Piwowarski et al. | | |
| 6,148,261 | A | | 11/2000 | Obradovich et al. | | |
| 6,151,552 | A | | 11/2000 | Koizumi et al. | | |
| 6,154,699 | A | | 11/2000 | Williams | | |

(Continued)

FOREIGN PATENT DOCUMENTS

JP 2001194172 7/2001

(Continued)

OTHER PUBLICATIONS

Transaction History of U.S. Appl. No. 12/195,152, filed Aug. 20, 2008, entitled "Systems and Methods for Smart City Search".

(Continued)

*Primary Examiner*—Khoi Tran
*Assistant Examiner*—Jorge O Peche
(74) *Attorney, Agent, or Firm*—Greenberg Traurig, LLP (57) ABSTRACT

A method of and apparatus for generating an alternate route for a system to travel to a predetermined destination are described. The method comprises determining a velocity of a system traveling along a primary route; and generating an alternate route to the primary route if the system velocity is below a predetermined motion threshold. A navigation system for generating an alternate route to a destination includes a motion sensor for detecting the navigation system velocity along a primary route and a controller coupled with the motion sensor. The controller receives a motion signal indicating navigation system motion and generates an alternate route to the primary route responsive to the motion signal indicating navigation system motion different from a predetermined motion threshold value.

19 Claims, 9 Drawing Sheets

U.S. PATENT DOCUMENTS

| | | | |
|---|---|---|---|
| 6,163,269 | A | 12/2000 | Millington et al. |
| 6,172,641 | B1 | 1/2001 | Millington |
| 6,175,801 | B1 | 1/2001 | Millington |
| 6,177,943 | B1 | 1/2001 | Margolin |
| 6,178,380 | B1 | 1/2001 | Millington |
| 6,184,823 | B1 | 2/2001 | Smith et al. |
| 6,189,130 | B1 | 2/2001 | Gofman et al. |
| 6,201,540 | B1 | 3/2001 | Gallup et al. |
| 6,204,778 | B1 | 3/2001 | Bergan et al. |
| 6,205,397 | B1 | 3/2001 | Eslambolchi et al. |
| 6,212,474 | B1 | 4/2001 | Fowler et al. |
| 6,223,118 | B1 | 4/2001 | Kobayashi et al. |
| 6,229,546 | B1 | 5/2001 | Lancaster et al. |
| 6,249,740 | B1 | 6/2001 | Ito et al. |
| 6,253,151 | B1 | 6/2001 | Ohler et al. |
| 6,256,029 | B1 | 7/2001 | Millington |
| 6,278,942 | B1 | 8/2001 | McDonough |
| 6,308,134 | B1 | 10/2001 | Croyle et al. |
| 6,320,517 | B1 | 11/2001 | Yano et al. |
| 6,321,158 | B1 | 11/2001 | DeLorme et al. |
| 6,349,257 | B1 * | 2/2002 | Liu et al. .................... 701/200 |
| 6,356,210 | B1 | 3/2002 | Ellis |
| 6,360,167 | B1 | 3/2002 | Millington et al. |
| 6,362,751 | B1 | 3/2002 | Upparapalli |
| 6,363,322 | B1 | 3/2002 | Millington |
| 6,370,475 | B1 | 4/2002 | Breed et al. |
| 6,377,278 | B1 | 4/2002 | Curtright et al. |
| 6,381,536 | B1 | 4/2002 | Satoh et al. |
| 6,385,535 | B2 | 5/2002 | Ohishi et al. |
| 6,385,542 | B1 | 5/2002 | Millington |
| 6,397,145 | B1 | 5/2002 | Millington |
| 6,405,130 | B1 | 6/2002 | Piwowarski |
| 6,408,243 | B1 | 6/2002 | Yofu |
| 6,427,115 | B1 | 7/2002 | Sekiyama |
| 6,430,501 | B1 | 8/2002 | Slominski |
| 6,453,235 | B1 | 9/2002 | Endo et al. |
| 6,484,089 | B1 | 11/2002 | Millington |
| 6,487,494 | B2 | 11/2002 | Odinak et al. |
| 6,515,595 | B1 | 2/2003 | Obradovich et al. |
| 6,529,822 | B1 | 3/2003 | Millington et al. |
| 6,529,824 | B1 | 3/2003 | Obradovich et al. |
| 6,539,301 | B1 | 3/2003 | Shirk |
| 6,565,610 | B1 | 5/2003 | Wang et al. |
| 6,574,551 | B1 | 6/2003 | Maxwell et al. |
| 6,631,322 | B1 | 10/2003 | Arthur et al. |
| 6,671,617 | B2 | 12/2003 | Odinak et al. |
| 6,704,649 | B2 | 3/2004 | Miyahara |
| 6,728,636 | B2 | 4/2004 | Kokijima et al. |
| 6,748,323 | B2 | 6/2004 | Lokshin et al. |
| 6,765,554 | B2 | 7/2004 | Millington |
| 6,774,932 | B1 | 8/2004 | Ewing |
| 6,816,596 | B1 | 11/2004 | Peinado et al. |
| 6,819,301 | B2 | 11/2004 | Nagamatsu et al. |
| 6,842,695 | B1 | 1/2005 | Tu |
| 6,873,907 | B1 | 3/2005 | Millington et al. |
| 6,885,874 | B2 | 4/2005 | Grube et al. |
| 6,917,982 | B1 | 7/2005 | Dueck et al. |
| 6,938,028 | B1 | 8/2005 | Ito |
| 7,031,834 | B2 | 4/2006 | Ito et al. |
| 7,031,836 | B2 | 4/2006 | Branch |
| 7,058,504 | B2 | 6/2006 | McDonough et al. |
| 7,170,518 | B1 | 1/2007 | Millington et al. |
| 7,233,860 | B2 | 6/2007 | Lokshin et al. |
| 7,260,475 | B2 | 8/2007 | Suzuki |
| 7,321,826 | B2 | 1/2008 | Sheha et al. |
| 7,333,820 | B2 | 2/2008 | Sheha et al. |
| 7,343,242 | B2 * | 3/2008 | Breitenberger et al. ...... 701/117 |
| 7,512,487 | B1 | 3/2009 | Golding et al. |
| 2001/0018628 | A1 | 8/2001 | Jenkins et al. |
| 2005/0065711 | A1 * | 3/2005 | Dahlgren et al. ............ 701/117 |
| 2005/0136949 | A1 * | 6/2005 | Barnes ........................ 455/461 |
| 2006/0287808 | A1 * | 12/2006 | Breitenberger et al. ...... 701/117 |
| 2007/0005229 | A1 * | 1/2007 | Breitenberger et al. ...... 701/117 |
| 2007/0213929 | A1 | 9/2007 | Tanizaki et al. |
| 2007/0293958 | A1 * | 12/2007 | Stehle et al. .................. 700/30 |
| 2008/0125958 | A1 | 5/2008 | Boss et al. |
| 2008/0133120 | A1 | 6/2008 | Romanick |
| 2008/0177470 | A1 * | 7/2008 | Sutardja ..................... 701/210 |
| 2008/0270016 | A1 | 10/2008 | Proietty et al. |
| 2009/0138190 | A1 | 5/2009 | Kulik |
| 2009/0150064 | A1 * | 6/2009 | Geelen ....................... 701/201 |

FOREIGN PATENT DOCUMENTS

| | | |
|---|---|---|
| JP | 2002048574 | 2/2002 |
| JP | 2006250875 | 9/2006 |
| JP | 2007155582 | 6/2007 |
| JP | 2007178182 | 7/2007 |
| JP | 2008002978 | 1/2008 |
| KR | 19990011004 | 2/1999 |
| KR | 19990040849 | 6/1999 |
| KR | 20020084716 | 11/2002 |
| KR | 20040106688 | 12/2004 |
| KR | 20070080726 | 8/2007 |

OTHER PUBLICATIONS

Transaction History of U.S. Appl. No. 61/122,640, filed Dec. 15, 2008, entitled "Systems and Methods for Providing Global Navigation Satellite System Assisted Maneuvering Guidance to a Vehicle Operator".

International Patent Application No. PCT/US2008/084659, Written Opinion and International Search Report, Apr. 28, 2009.

International Patent Application No. PCT/US2009/030177, Writtten Opinion and International Search Report, Apr. 29, 2009.

International Patent Application No. PCT/US2009/030314, Written Opinion and International Search Report, May 25, 2009.

Shamir, Adi et al., "Playing 'Hide and Seek' with Stored Keys," Lecture Notes in Computer Science, vol. 1648, 1991, pp. 118-124.

* cited by examiner

SMART DETOUR

FIELD

The disclosed embodiments relate to automatic determination of route guidance information.

BACKGROUND

Existing vehicle navigation systems receive position information signals from one or more on-board sensors and determine a position of the vehicle. For example, some navigation systems receive global positioning system (GPS) signals transmitted from orbiting satellites and calculate a position of the vehicle with respect to the satellites.

SUMMARY

The present embodiments provide a mechanism for the automatic determination of route guidance information to a user.

A method embodiment of generating an alternate route for a system to travel to a predetermined destination includes determining a velocity of a system traveling along a primary route; and generating an alternate route to the primary route if the system velocity is below a predetermined motion threshold.

A system embodiment for generating an alternate route to a destination includes a motion sensor for detecting the navigation system velocity along a primary route and a controller coupled with the motion sensor. The controller receives a motion signal indicating navigation system motion and generates an alternate route to the primary route responsive to the motion signal indicating navigation system motion different from a predetermined motion threshold value.

Still other advantages of the embodiments will become readily apparent to those skilled in the art from the following detailed description, wherein the preferred embodiments are shown and described, simply by way of illustration of the best mode contemplated of carrying out the invention. As will be realized, the invention is capable of other and different embodiments, and its several details are capable of modifications in various obvious respects, all without departing from the embodiments.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
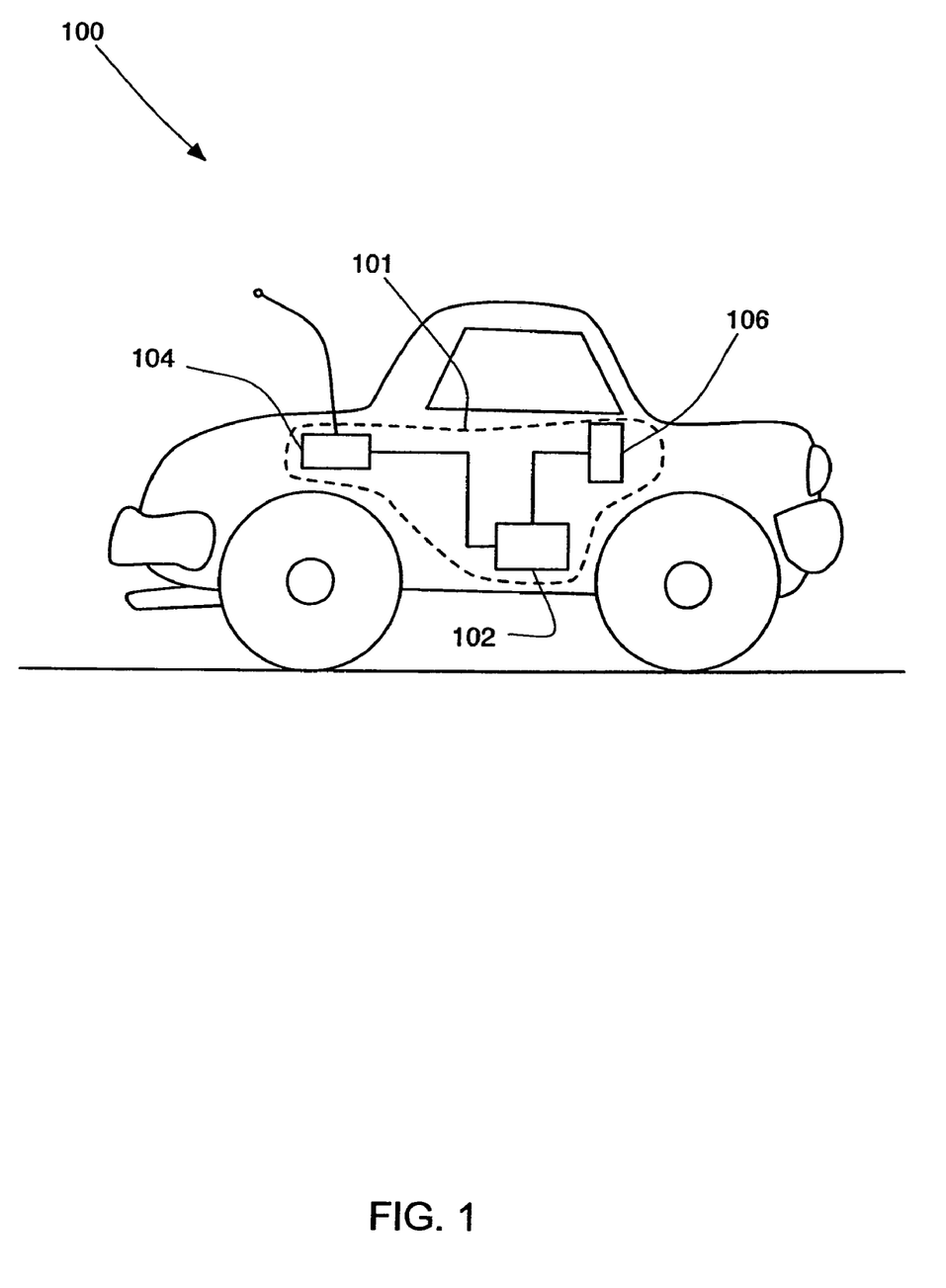
FIG. 1 is a high level block diagram of a vehicle including a vehicle navigation system.

As described in detail below, FIG. 1 depicts a vehicle 100 including a navigation system 101 having a navigation controller 102, a navigation sensor 104, and a user interface (UI) device 106. UI device 106 receives user entered commands and information and generates audio/visual information for viewing/hearing by the user responsive to navigation controller 102. Navigation sensor 104 generates and transmits position information to navigation controller 102 responsive to receipt of position signals. Navigation controller 102 receives position information from navigation sensor 104 and user entered commands from UI device 106 and determines a route from the present location of vehicle 100 to a user-specified destination.

In some embodiments, navigation sensor 104 is one of a satellite-based, ground-based, self-contained, and/or a combination thereof. Some example sensor systems usable with embodiments include global positioning system (GPS), Loran, very high frequency (VHF) omni-directional range (VOR), VOR/distance measuring equipment (DME), non-directional beacon (NDB), and an inertial reference system (IRS).

In accordance with an embodiment, navigation system 101 executing a sequence of instructions (as described more fully below in conjunction with FIG. 2) determines that vehicle 100 has slowed or stopped for a time period exceeding a predetermined timeout value during traversal of a route to a user-specified destination. For example, vehicle 100 may have encountered stopped or slowed traffic, a road blockage, an emergency situation, and other situations in which the vehicle is unable to proceed/slowed along the guided route provided by navigation system 101. After determining slowing or stopping of vehicle 100, navigation system 101 prompts the user to decide whether the navigation system should determine an alternate route to reach the user-specified destination from the current location of the vehicle along the previously determined route. If the user requests navigation system 101 to determine an alternate route (also referred to as replanning), the system determines the alternate route based on the current position of the vehicle, the user-specified destination, and an inability of the vehicle to traverse all or a portion of the remaining portion of the previously determined route.

In a further embodiment and in response to the user request, navigation system 101 determines more than one alternate route to reach the user-specified destination from the current location of the vehicle along the previously determined route. Navigation system 101 causes UI device 106 to display one or more of the determined alternate routes to the user for selection.

In another embodiment, after determining slowing or stopping of vehicle 100, navigation system 101 automatically determines one or more alternate routes to reach the user-specified destination from the current location of the vehicle along the previously determined route. As above, navigation system 101 causes UI device 106 to display one or more of the automatically determined alternate routes to the user for selection.

After selection of an alternate route by the user in accordance with at least one of the above embodiments, navigation system 101 provides route guidance information to the user using UI device 106 based on the determined alternate route.

As briefly described above, FIG. 1 depicts a vehicle 100 including navigation system 101 comprising navigation controller 102 connected with navigation sensor 104 and UI device 106. Navigation sensor 104 receives position information signals and calculates and transmits the vehicle position to navigation controller 102. Navigation controller 102 receives the vehicle position from navigation sensor 104 and causes UI device 106 to display the vehicle position to a user. For example, UI device 106 displays a map depicting the vehicle position and current heading to the driver of vehicle 100. Additionally in some instances, UI device 106, responsive to input from navigation controller 102, displays route guidance information to the user regarding how to reach a predetermined destination specified by the user using the UI device. Optionally, UI device 106 uses audio instructions in addition to, or in place of, visual instructions to supply the route guidance information.

During operation, navigation system 101 provides audio and visual route guidance information to the user to direct the user to reach a predetermined destination position. The user follows the provided route guidance information, e.g., audible turn-by-turn instructions, and causes the vehicle to travel along a route determined by navigation controller 102 to reach the user's destination. During traversal of the route, navigation controller 102 continuously and/or periodically monitors the vehicle position based on receipt of position information from navigation sensor 104. By performing map matching and/or one or more other techniques, navigation controller 102 updates a stored position value of the vehicle and causes UI device 106 to update the displayed information and generate audible information provided to the user.

Figure 2:
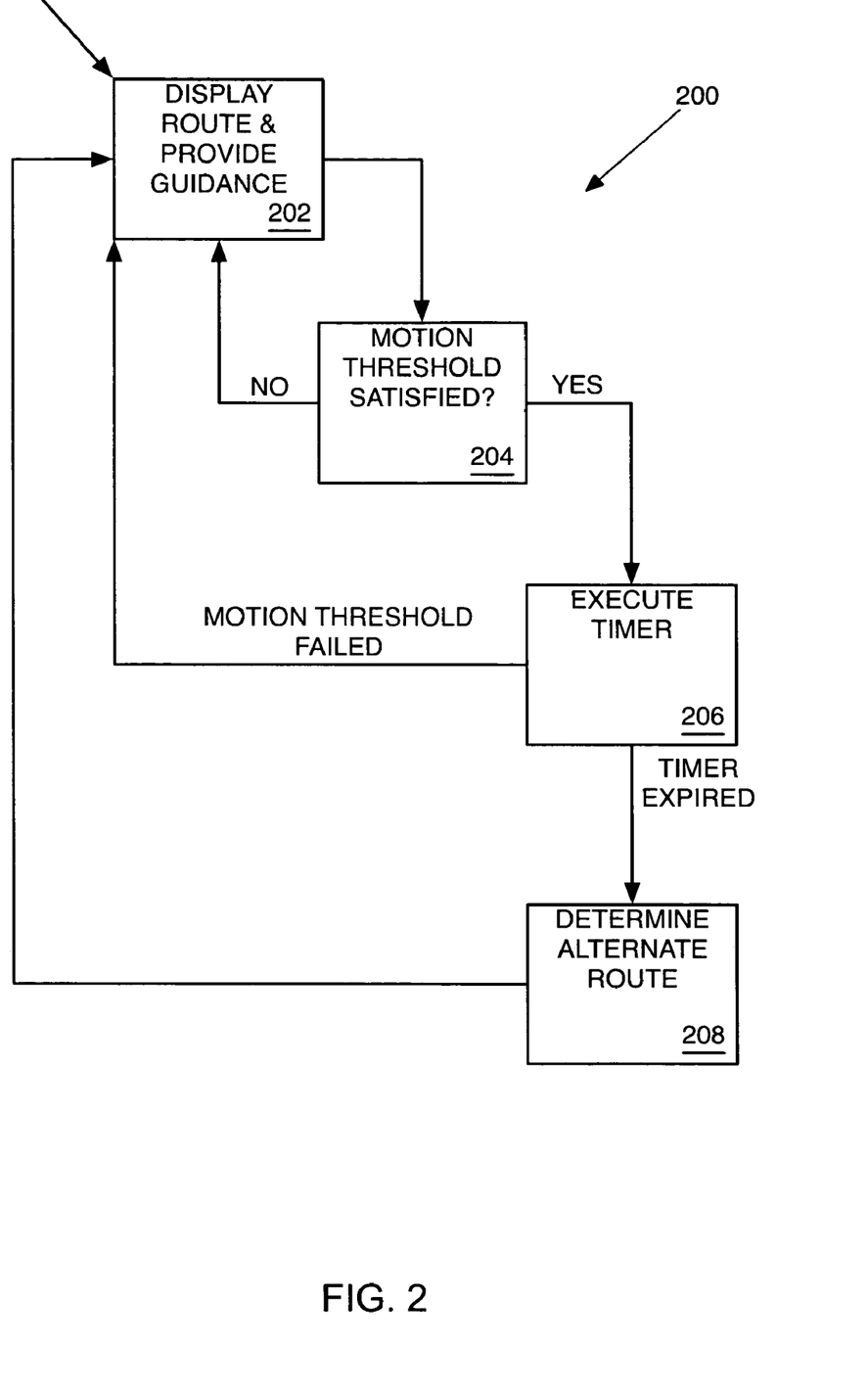
FIG. 2 is a process flow diagram of a process according to an embodiment.
Figure 3:
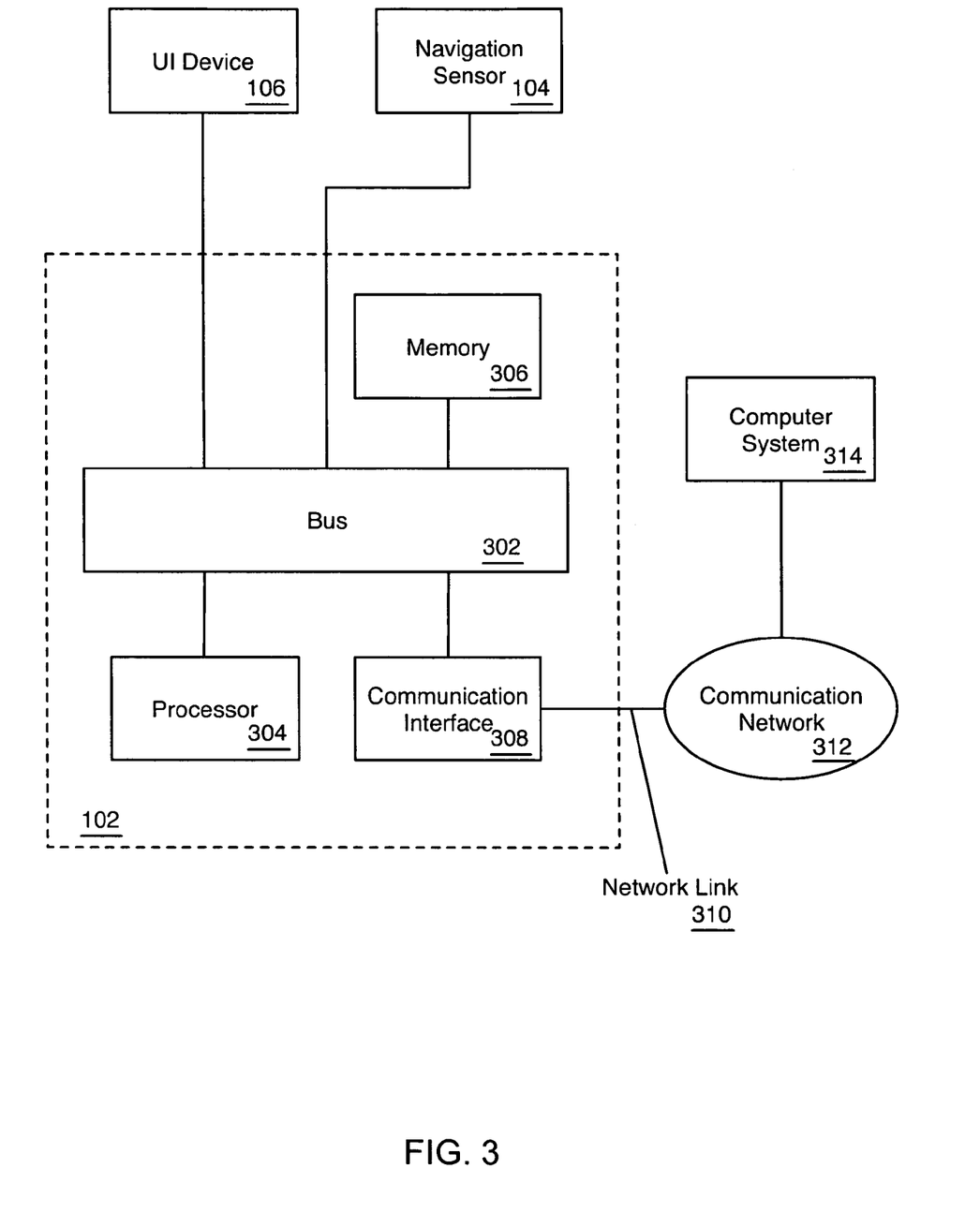
FIG. 3 is a high level block diagram of a processing device usable in conjunction with an embodiment.

FIG. 2 depicts a high level process flow diagram of a portion 200 of a sequence of instructions executed by navigation controller 102 according to an embodiment. Navigation controller 102 is a processing device, e.g., a processor, an application specific integrated circuit, or a computer system or other device capable of executing a sequence of instructions. FIG. 3 described in detail below depicts a navigation controller 102 on which an embodiment may be implemented.

Navigation controller 102 executing a sequence of instructions, e.g., stored in a memory such as memory 306, proceeds to step 202 and causes UI device 106 to provide route information to the user based on an existing determined route to the user-specified destination. Navigation controller 102 proceeds to step 204 and determines, based on received position information signals from navigation sensor 104, whether the motion of vehicle 100 differs from, e.g., falls below, a predetermined vehicle motion threshold. That is, navigation controller 102 determines if vehicle 100 has stopped or slowed during traversal of a determined route.

If the outcome of the step 204 determination is negative, i.e., the vehicle is traveling at a velocity meeting or exceeding the predetermined vehicle motion threshold, the process flow proceeds to return to step 202 and continue displaying and providing route guidance information to the user. If the outcome of the step 204 determination is positive, i.e., the vehicle is traveling at a velocity below the predetermined vehicle motion threshold, the process flow proceeds to step 206 and a timer is started.

During execution of process step 206, navigation controller 102 determines, based on received position information signals from navigation sensor 104, whether the motion of vehicle 100 continues to differ from, e.g., falls below, the predetermined vehicle motion threshold. If the motion threshold is met or exceeded by vehicle 100, navigation controller 102 stops (and optionally resets) the timer execution and the flow of control proceeds to return to step 202. For example, the user may temporarily stop or slow vehicle 100 due to travel conditions and then return to traveling speed.

If the timer expires, i.e., the timer meets or exceeds a predetermined timeout value, and vehicle 100 has not exceeded the predetermined vehicle motion threshold, the vehicle is determined to have stopped or slowed for an excessive amount of time and the user is prompted regarding an alternate route determination.

According to the FIG. 2 embodiment, navigation controller 102 proceeds to step 208 in response to the motion of vehicle 100 falling below the predetermined vehicle motion threshold for the predetermined timeout value. In step 208, navigation controller 102 determines (replans) an alternate route for vehicle 100 to reach the user-specified destination without continuing along at least a portion of the currently traversed route. That is, navigation controller 102 determines an alternate route for the user to travel which avoids the current route conditions. The process flow of navigation controller 102 proceeds to return to step 202 and the controller causes UI device 106 to display route and/or provide guidance information to the user in accordance with the determined alternate route.

Figure 4:
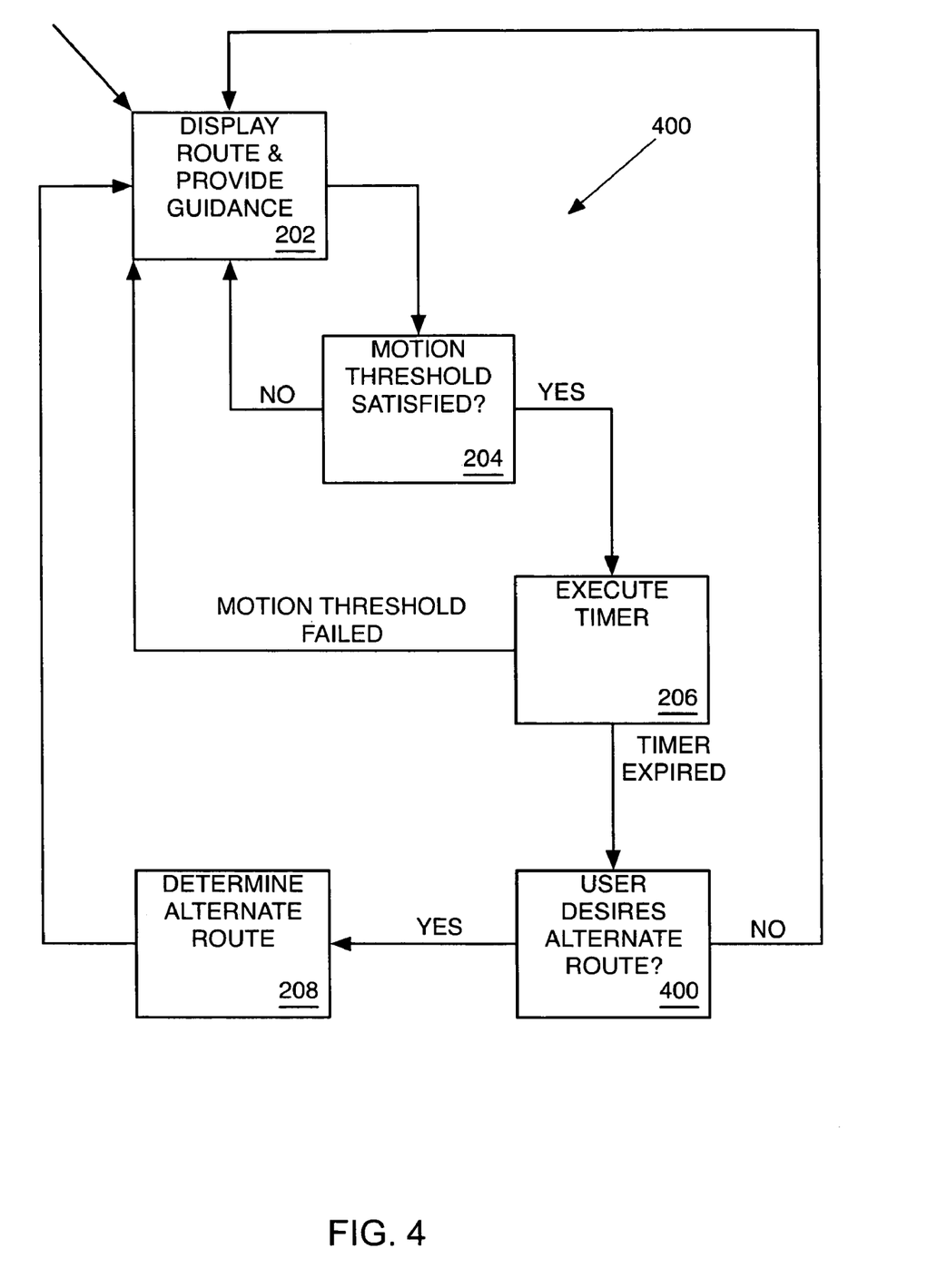
FIG. 4 is a process flow diagram according to another embodiment.

FIG. 4 depicts a variation on the FIG. 2 embodiment in which a process flow 400 similar to process flow 200 is executable by navigation controller 102. Navigation controller 102 executes the process flow 400 as in execution of process flow 200 until the expiration of the timer at step 206. In accordance with FIG. 4, instead of transitioning directly to step 208 the process flow proceeds to step 402 and navigation controller 102 causes UI device 106 to prompt the user to decide whether to cause the controller to determine an alternate route to the user-specified destination.

If the user responds positively to UI device 106 in response to step 402, the process flow proceeds to step 208 and navigation controller 102 executes the steps (process steps 208, 202) as described above with respect to FIG. 2. If the user responds negatively to UI device 106 in response to step 402, the process flow proceeds to return to step 202 and display the original route and/or provide route guidance information to the user based on the original route.

Figure 5:
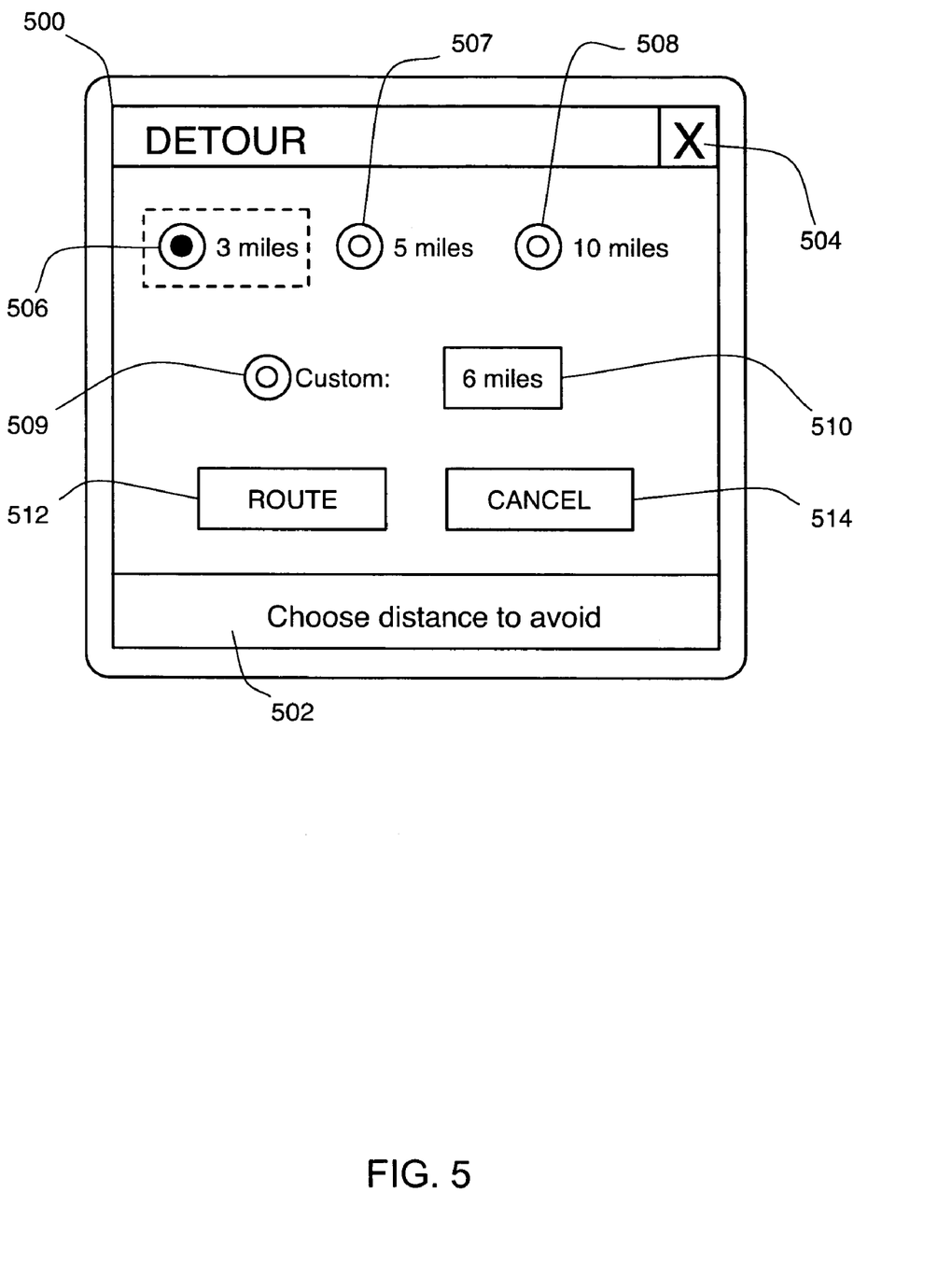
FIG. 5 is a prompt window according to an embodiment.

FIG. 5 depicts an exemplary prompt window 500 displayed by UI device 106 to the user at step 402 (FIG. 4) in order to prompt the user to decide whether to cause the controller to determine an alternate route as described above. Prompt window 500 includes a text box 502 for prompting the user to decide whether navigation controller 102 should determine an alternate route. In the FIG. 5 embodiment, text box 502 prompts the user to choose a distance to avoid in replanning the route. Selection of a close window box 504 by the user causes navigation controller 102 to receive a negative response at step 402 (FIG. 4) and proceed to return to step 202 in process flow 400. Prompt window 500 also includes four radio buttons 506-509 corresponding to distances defining the length of an alternate route detour which navigation controller uses to plan the alternate route. That is, navigation controller 102 determines an alternate route to reach the user-specified destination by planning a detour of a given length, specified by user selection of one of the radio buttons 506-509, from the current location of navigation system 101. FIG. 5 depicts a user selection (by way of a dashed line around radio button 506 and a changed display status of radio button 506) of a 3 mile detour.

Selection of radio button 509 causes an additional input screen (not shown) to be displayed by UI device 106 to enable the user to enter a user-specified value for the detour length. The user-specified detour length is displayed in custom text box 510 after entry.

A route button 512 enables a user to positively respond to the prompt generated at step 400 (FIG. 4) and thereby cause navigation controller 102 to determine an alternate route based on a selected detour length as specified by one of radio buttons 506-509. A cancel button 514, similar to close window box 504, enables the user to respond negatively to the step 402 (FIG. 4) prompt and cause navigation controller 102 to proceed to return to step 202 in process flow 400.

In another embodiment, UI device 106 displays a prompt (not shown), e.g., a button, text, or other indicator, on an existing screen in place of generating a separate prompt window 500. Selection of the displayed prompt by the user causes generation of a positive user response to navigation controller 102 and subsequent processing according to the user response.

Figure 6:
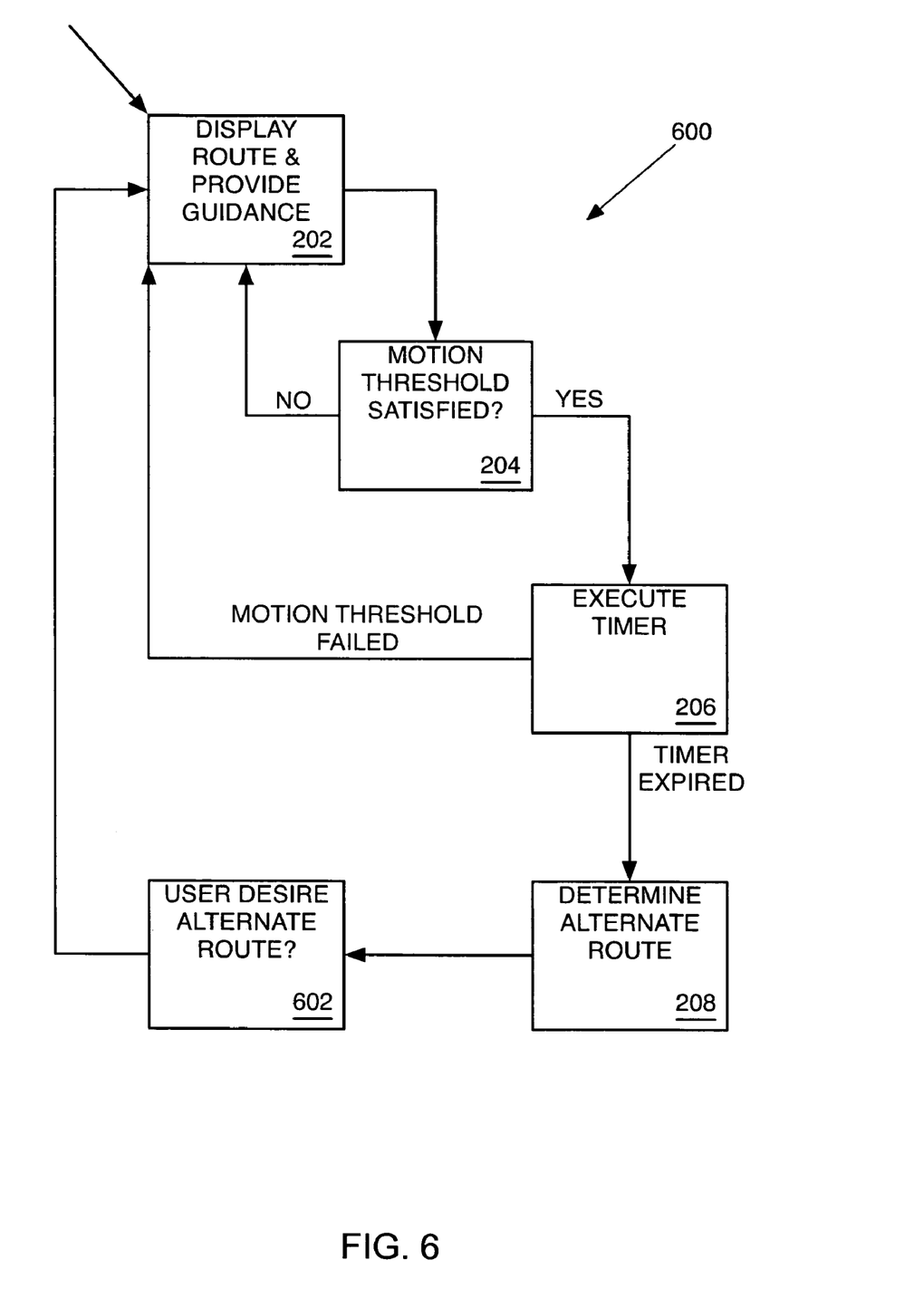
FIG. 6 is a process flow diagram according to another embodiment.

FIG. 6 depicts a variation on the FIG. 2 embodiment in which a process flow 600 similar to process flow 200 is executable by navigation controller 102. Navigation controller 102 executes process flow 600 as in execution of process flow 200 until the determination of an alternate route at step 208. In accordance with FIG. 6, instead of transitioning directly to return to step 202 the process flow proceeds to step 602 and navigation controller 102 causes UI device 106 to prompt the user to decide whether to use the determined alternate route.

If the user responds positively by way of appropriate manipulation of UI device 106, navigation controller 102 proceeds to step 202 and displays the route and/or provides route guidance information to the user based on the determined alternate route. If the user responds negatively using UI device 106, navigation controller 102 proceeds to step 202 and displays the route and/or provides route guidance information to the user based on the existing route.

In an embodiment, navigation controller 102 determines more than one alternate route and presents one or more of the determined alternate routes to the user via UI device 106 and requests the user to select one of the alternate routes or continue using the existing route, similar to the above-described process.

Figure 7:
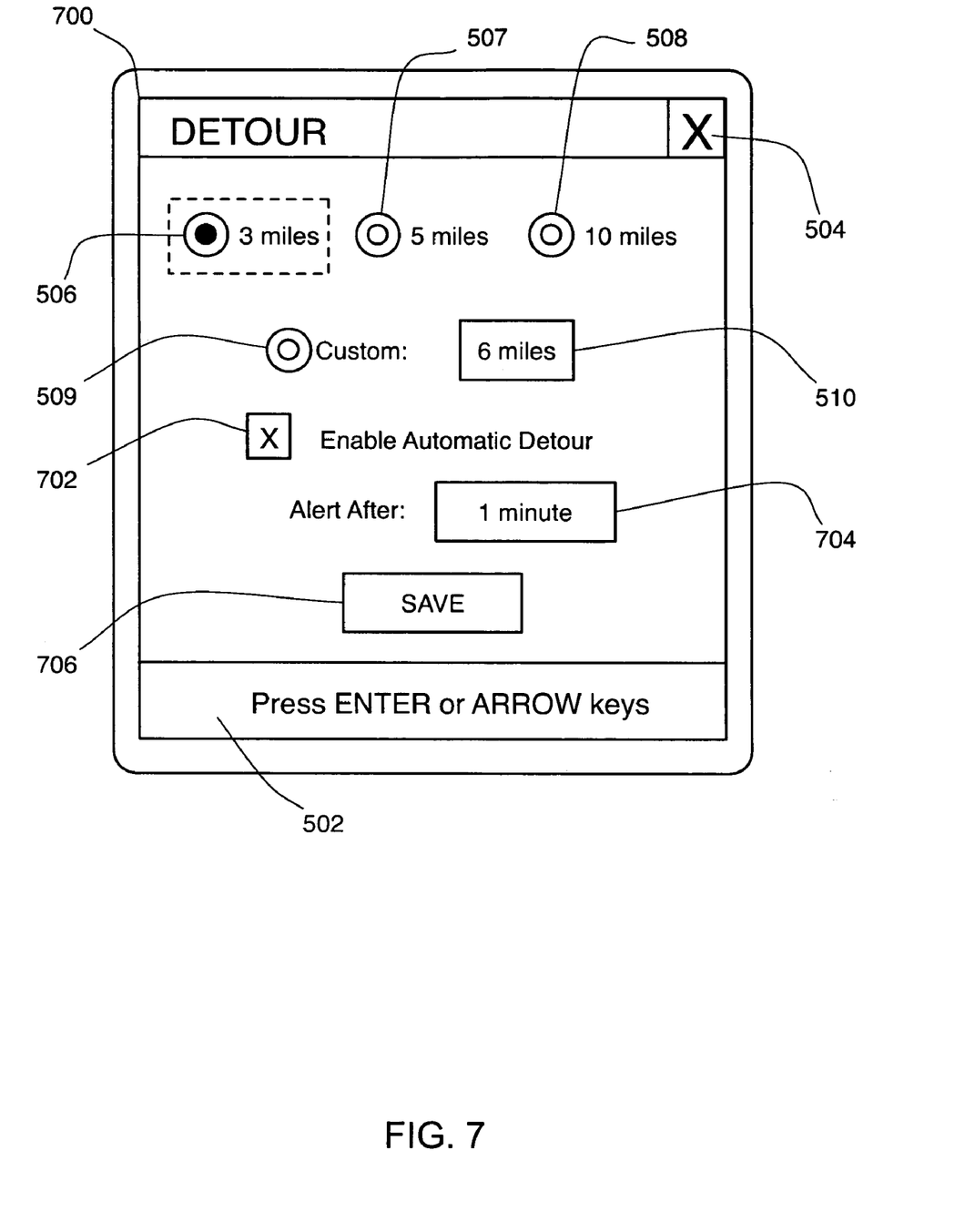
FIG. 7 is a settings window according to an embodiment.

FIG. 7 depicts a settings window 700, referred to as a preferences window, enabling a user to specify particular parameter values to be used by navigation controller 102 according to some embodiments. Settings window 700 includes the text box 502 for prompting the user to manipulate UI device 106 to receive user entered preference values. Settings window 700, similar to prompt window 500, includes the four radio buttons 506-509, as well as, custom text box 510 for receiving user entry of detour distance preferences. In an embodiment, use of radio buttons 506-509 and text box 510 in settings window 700 may obviate the need for such buttons in prompt window 500 and thereby further simplify the interface of the prompt window.

Manipulation of an enable checkbox 702 causes UI device 106 to generate a signal to navigation controller 102 to enable the detour processing described herein. If enable checkbox 702 is not activated, navigation controller 102 does not perform detour processing determination. If enable checkbox 702 is activated, navigation controller 102 performs detour processing according to a described embodiment.

Selection of alert timeout button 704 causes an additional input screen (not shown) to be displayed by UI device 106 to enable the user to enter a user-specified value for the predetermined timeout value. The user-specified predetermined timeout value is displayed in alert timeout button 704 after entry. In some embodiments, after selection of alert timeout button 704 by a user, UI device 106 presents one or more predetermined timeout values for user selection. In further embodiments, UI device 106 displays the predetermined timeout values for selection by the user similar to the detour length values presented using radio buttons 506-509 and text box 510 and similar functionality.

Responsive to user selection of a save button 706, UI device 106 causes navigation controller 102 to store the user-specified settings entered using settings window 700, e.g., store the settings to memory 306.

Figure 8:
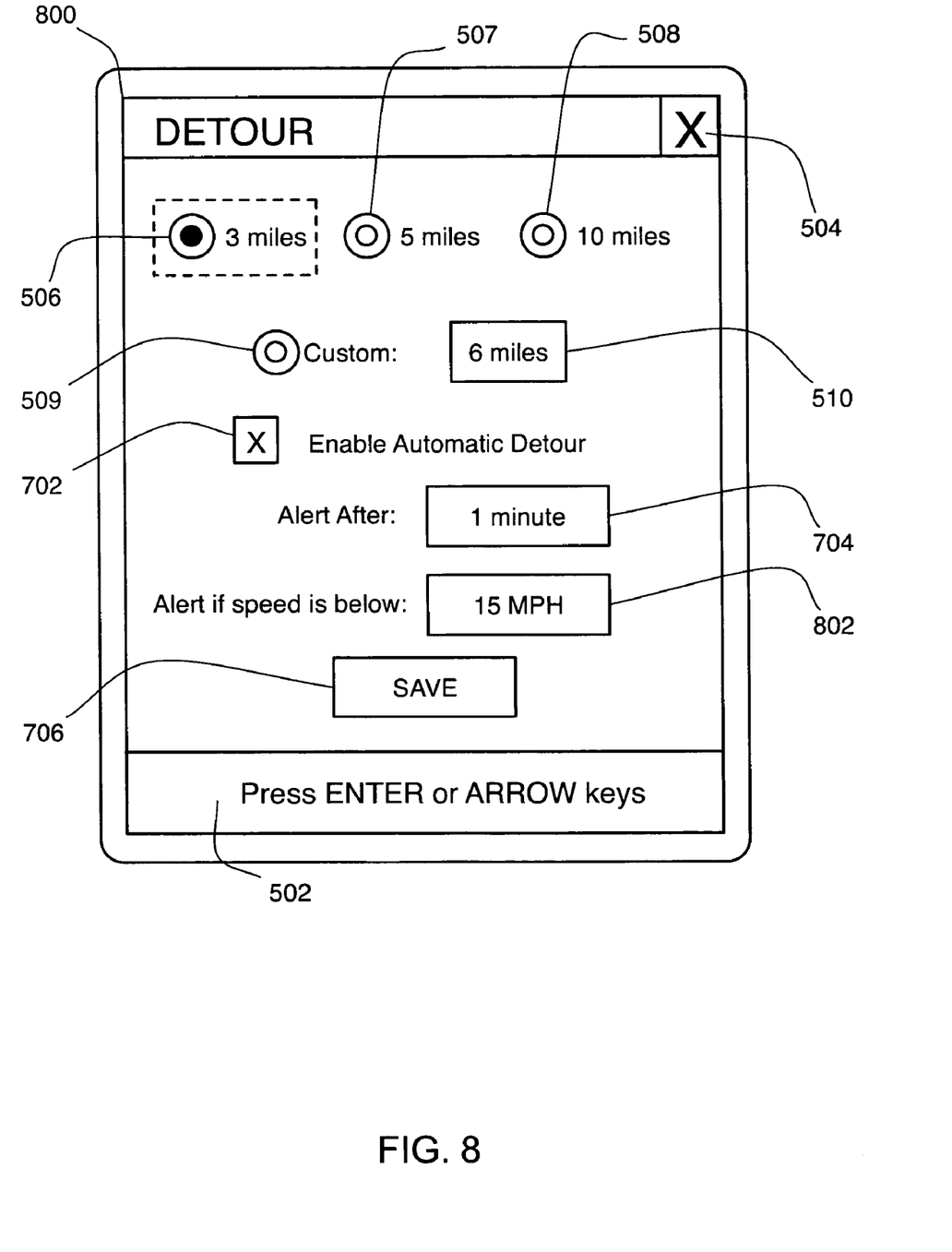
FIG. 8 is a settings window according to another embodiment.

FIG. 8 depicts a variation on the FIG. 7 settings window in which a settings window 800 further includes a motion threshold value button 802 to be displayed by UI device 106 to enable the user to enter a user-specified value for the predetermined motion threshold value. The user-specified predetermined motion threshold value is displayed in motion threshold value button 802 after entry. In some embodiments, after selection of motion threshold value button 802 by a user, UI device 106 presents one or more predetermined motion threshold values for user selection. In further embodiments, UI device 106 displays the predetermined motion threshold values for selection by the user similar to the detour length values presented using radio buttons 506-509 and text box 510 and similar functionality.

Figure 9:
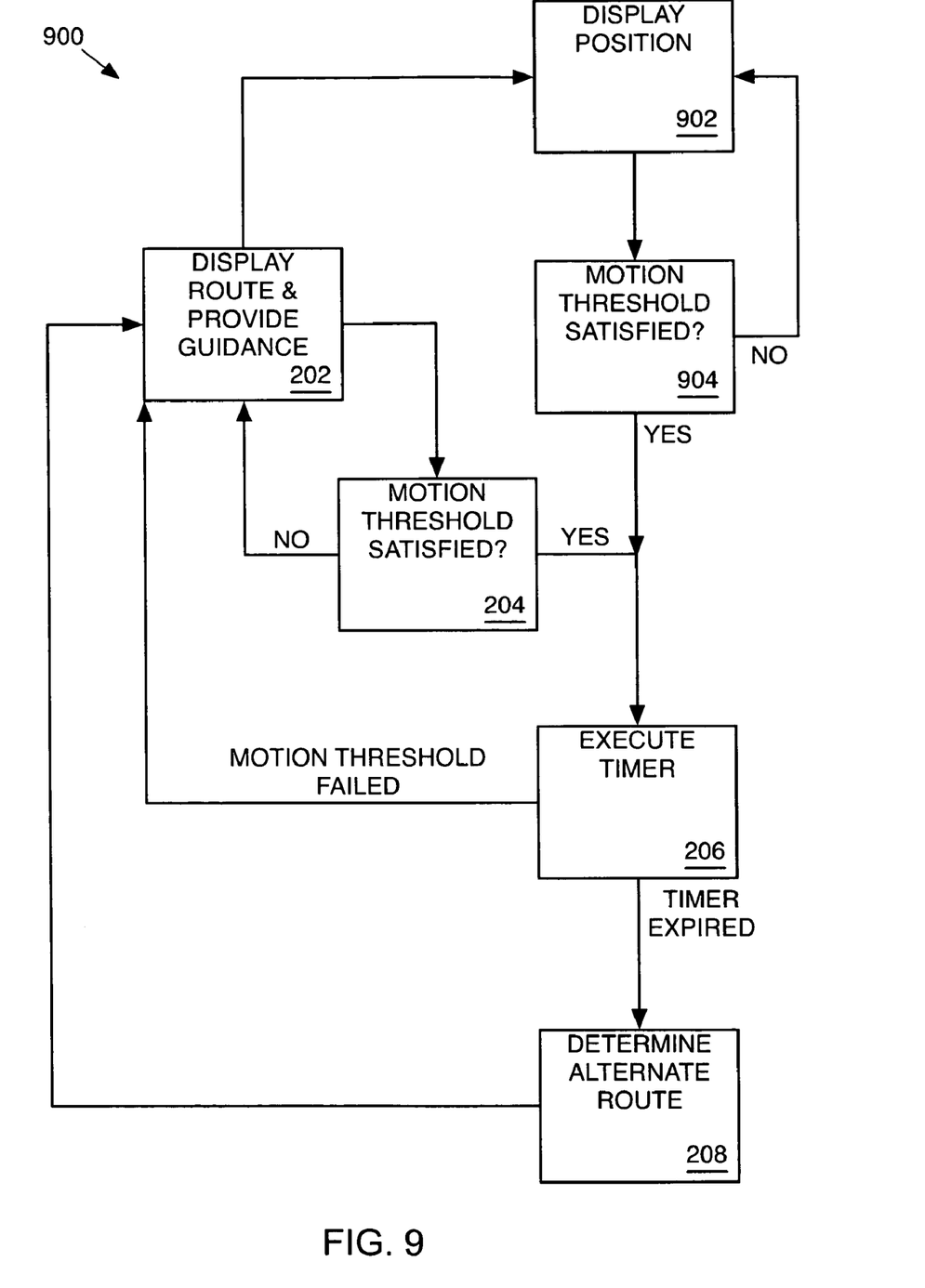
FIG. 9 is a process flow diagram according to another embodiment.

FIG. 9 depicts a further embodiment of a process flow 900 in which a vehicle 100 traveling along a road, e.g., a street, highway, freeway, path, or other unplanned route, slows or stops due to road conditions and navigation controller 102 determines an alternate route as described above. In particular in accordance with the FIG. 9 embodiment, navigation controller 102 executes step 902 to display the position of vehicle 100 using UI device 106 based on position information signals from navigation sensor 104. As in the FIG. 2 embodiment, navigation controller 102 proceeds to step 904 and determines, based on received position information signals from navigation sensor 104, whether the motion of vehicle 100 differs from, e.g., falls below, a predetermined vehicle motion threshold. That is, navigation controller 102 determines if vehicle 100 has stopped or slowed.

If the outcome of the step 904 determination is negative, i.e., the vehicle is traveling at a velocity meeting or exceeding the predetermined vehicle motion threshold, the process flow proceeds to return to step 902 and continues displaying and providing route guidance information to the user. If the outcome of the step 904 determination is positive, i.e., the vehicle is traveling at a velocity below the predetermined vehicle motion threshold, the process flow proceeds to step 206 and a timer is started as described above with respect to FIG. 2.

According to the FIG. 9 embodiment, if the step 206 timer expires and vehicle 100 has not exceeded the predetermined vehicle motion threshold, the vehicle is determined to have stopped or slowed for an excessive amount of time and navigation controller 102 determines an alternate route. For example, navigation controller 102 determines an alternate route to detour vehicle 100 for the predetermined detour distance and routes the vehicle back to the current road at the next available location, e.g., returns the vehicle to the freeway at the next available on-ramp.

Process flow 900 continues to be executed by navigation controller 102 as described above with respect to FIG. 2. After completing the detour, navigation controller 102 proceeds to return to step 902. Additional embodiments similar to the other embodiments described above, e.g., FIGS. 4 and 6, are also usable in conjunction with the FIG. 9 embodiment.

FIG. 3 depicts a high level block diagram of a processing device, e.g., navigation controller 102, usable in conjunction with the above-described embodiments and upon which an embodiment may be implemented.

Navigation controller 102 includes a bus 302 or other communication mechanism for communicating information, and a processor 304 coupled with the bus for processing information. Navigation controller 102 also includes a memory 306, such as a random access memory (RAM) or other dynamic storage device, coupled to the bus 302 for storing settings values, e.g., motion threshold values, timeout values, data, and instructions to be executed by processor 304. Memory 306 also may be used for storing temporary variables or other intermediate information during execution of instructions to be executed by processor 304. Memory 306 may also include a read only memory (ROM) or other static storage device coupled to the bus 302 for storing static information and instructions for processor 304. A storage device (not shown), such as a magnetic disk or optical disk, may be provided and coupled to bus 302 for storing data and instructions.

Navigation controller 102 is coupled via bus 302 to UI device 106, such as a flat panel, cathode ray tube, or other display device, input device, including alphanumeric and function keys, and other types of user interaction devices, such as a mouse, a trackball, cursor direction keys, or other device for communicating information and command selections to processor 304.

Embodiments are related to the use of navigation controller 102 to determine alternate routes responsive to detection of certain conditions. According to an embodiment, navigation controller 102 operates in response to processor 304 executing sequences of instructions contained in memory 306 in response to input received via navigation sensor 104 and/or UI device 106, or a communication interface 308. Such instructions may be read into memory 306 from another computer-readable medium, such as a storage device (not shown).

However, the computer-readable medium is not limited to devices such as a storage device. For example, the computer-readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an electrically programmable ROM (EPROM), a FLASH-EPROM, any other memory chip or cartridge, a carrier wave embodied in an electrical, electromagnetic, infrared, or optical signal, or any other medium from which a computer can read. Execution of the sequences of instructions contained in the memory 306 causes the processor 304 to perform the process steps described above. In alternative embodiments, hard-wired circuitry may be used in place of or in combination with computer software instructions to implement the invention. Thus, embodiments are not limited to any specific combination of hardware circuitry and software.

Navigation controller 102 also includes a communication interface 308 coupled to bus 302. Communication interface 308 provides a two-way data communication and may include wired and wireless links.

A network link 310 provides data communication through one or more networks to other data devices. For example, network link 310 may provide a connection through communication network 312 to a host computer 314 or to data equipment operated by a communication service provider. Network link 310 uses electrical, electromagnetic, or optical signals which carry digital data streams. The signals through the network and the signals on network link 310 and through communication interface 308, which carry the digital data to and from navigation controller 102, are exemplary forms of carrier waves transporting the information.

Navigation controller 102 can send messages and receive data, including program code, through the network(s), network link 310 and communication interface 308. In an Internet example, a computer system 314 might transmit a requested code for an application program through communication network 312, network link 310, and communication interface 308. In accordance with an embodiment, one such downloaded application provides for determining an alternate route based on certain conditions.

The received code may be executed by processor 304 as it is received, and/or stored in memory 306, or other non-volatile storage for later execution. In this manner, navigation controller 102 may obtain application code in the form of a carrier wave.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

For example, audio generation of prompts and interactive voice response and/or voice recognition may be used in place of or in addition to user physical manipulation of an interface mechanism such as a display or keyboard/mouse/trackball/touch sensitive pad.

What is claimed is:

1. A method implemented on a navigation system installed on a vehicle to generate an alternate route for the vehicle to travel to a predetermined destination, the method comprising:
   receiving, by the navigation system, a detour distance;
   receiving, by the navigation system, a predetermined timeout value;
   determining, using a motion sensor installed on the vehicle, a velocity of the vehicle on which the navigation system is installed, while the vehicle is traveling along a primary route;
   determining whether the velocity of the vehicle has been below a predetermined vehicle motion threshold for a time period exceeding the predetermined timeout value; and
   generating, by the navigation system automatically, an alternate route to guide the vehicle to travel to the predetermined destination on a detour of the primary route in accordance with the detour distance, in response to a determination that the velocity of the vehicle on which the navigation system is installed has been below the predetermined vehicle motion threshold for a time period exceeding the predetermined timeout value.

2. A method according to claim 1, further comprising:
   presenting a user interface to receive a timeout value from a user of the navigation system as the predetermined timeout value.

3. A method according to claim 1, further comprising:
   receiving a user response regarding generating an alternate route.

4. A method according to claim 3, further comprising:
   prompting a user of the navigation system to decide whether to use the alternate route;
   wherein the alternate route is generated before the user is prompted to decide whether to use the alternate route.

5. A method according to claim 1, further comprising:
   presenting a user interface to receive the detour distance from a user of the navigation system.

6. A method according to claim 5, wherein the detour distance is a user-specified, custom detour distance.

7. A method according to claim 1, further comprising: providing route information to a user based on the generated alternate route.

8. A method according to claim 1, further comprising: presenting a user interface to allow a user of the system to enable or disable an option for the navigation system to automatically compute a detour route when the velocity of the vehicle has been below a predetermined vehicle motion threshold for a time period exceeding the predetermined timeout value;

wherein the generating of the alternate route is performed if the option is enabled via the user interface.

9. A method according to claim 3, wherein the user response includes a user request for generation of an alternate route.

10. A method according to claim 9, wherein the user response further includes at least one of a user-specified vehicle motion threshold, a user-specified timeout value, and a user-specified detour distance.

11. A navigation system installed on a vehicle to generate an alternate route to a destination, the navigation system comprising:

a motion sensor configured to generate a motion signal indicative of a velocity of the vehicle while the vehicle is travelling along a primary route; and a controller operatively coupled with the motion sensor and arranged to receive the motion signal, the controller arranged to:

receive a detour distance;

receive a predetermined timeout value;

determine whether the velocity of the vehicle, on which the navigation system is installed, has been below a predetermined vehicle motion threshold for a time period exceeding the predetermined timeout value; and generate automatically an alternate route to guide the vehicle to travel to the destination on a detour of the primary route in accordance with the detour distance, responsive to the motion signal being below the predetermined vehicle motion threshold for a time period exceeding the predetermined timeout value.

12. A navigation system according to claim 11, further comprising:

a user interface to receive a timeout value from a user of the navigation system as the predetermined timeout value.

13. A navigation system according to claim 11, further comprising:

a user interface to receive the detour distance from a user of the navigation system.

14. A navigation system according to claim 11, further comprising:

a user interface device operatively coupled with the controller and arranged to provide information to a user and receive user commands.

15. A navigation system according to claim 14, wherein the user interface device is arranged to receive a user response regarding generation of an alternate route.

16. A navigation system according to claim 15, wherein the user response includes a user request for generation of an alternate route; and wherein the controller is arranged to generate the alternate route if the user requests generation of the alternate route.

17. A navigation system according to claim 15, wherein the user response includes at least one of a user-specified vehicle motion threshold, a user-specified timeout value, and a user-specified detour distance.

18. A computer-readable medium storing instructions which, when executed by a processor of a navigation system installed on a vehicle, cause the processor to perform a method, the method comprising:

receiving a detour distance;

receiving a predetermined timeout value;

determining, using a motion sensor installed on the vehicle, a velocity of the vehicle while the vehicle is traveling along a primary route;

determining whether the velocity of the vehicle on which the navigation system is installed has been below a predetermined vehicle motion threshold for a time period exceeding the predetermined timeout value; and generating, automatically, an alternate route to guide the vehicle to travel to the predetermined destination on a detour of the primary route based on the detour distance, in response to a determination that the velocity of the vehicle on which the navigation system is installed has been below the predetermined vehicle motion threshold for a time period exceeding the predetermined timeout value.

19. The computer-readable medium of claim 18, wherein the computer-readable medium comprises a memory.

* * * * *